United States Patent
Elving (10) Patent No.: US 9,542,335 B1
(45) Date of Patent: Jan. 10, 2017

(54) METHODS AND SYSTEMS FOR RULE-BASED FLEXIBLE CACHE INVALIDATION

(71) Applicant: Google Inc., Mountain View, CA (US)

(72) Inventor: Christopher Henning Elving, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 280 days.

(21) Appl. No.: 14/341,512

(22) Filed: Jul. 25, 2014

(51) Int. Cl.
*G06F 12/00* (2006.01)
*G06F 12/12* (2016.01)
*G06F 12/08* (2016.01)

(52) U.S. Cl.
CPC ......... *G06F 12/121* (2013.01); *G06F 12/0891* (2013.01)

(58) Field of Classification Search
None
See application file for complete search history.

(56) References Cited

U.S. PATENT DOCUMENTS

| | | | |
|---|---|---|---|
| 5,649,200 A | 7/1997 | Leblang et al. | |
| 7,111,057 B1 | 9/2006 | Sherman et al. | |
| 7,299,408 B1 | 11/2007 | Daconta et al. | |
| 7,509,404 B2 | 3/2009 | Agrawal et al. | |
| 7,716,182 B2 | 5/2010 | Tewksbary | |
| 8,301,839 B2 | 10/2012 | Sundarrajan et al. | |
| 8,401,986 B1* | 3/2013 | Franke | G06N 5/02 706/47 |
| 2004/0044731 A1* | 3/2004 | Chen | H04L 67/2842 709/203 |
| 2008/0209120 A1 | 8/2008 | Almog et al. | |
| 2009/0299939 A1* | 12/2009 | Jung | G06N 5/025 706/47 |
| 2012/0203861 A1 | 8/2012 | Flack et al. | |
| 2012/0203984 A1 | 8/2012 | Woffinden | |
| 2014/0095804 A1 | 4/2014 | Lientz | |

OTHER PUBLICATIONS

Bhattacharya, R., German, S. M., & Gopalakrishnan, G. (2006). Exploiting symmetry and transactions for partial order reduction of rule based specifications. In Model Checking Software (pp. 252-270). Springer Berlin Heidelberg.

(Continued)

*Primary Examiner* — Prasith Thammavong
*Assistant Examiner* — Jason Blust
(74) *Attorney, Agent, or Firm* — McDermott Will & Emery LLP (57) ABSTRACT

Methods and systems for cache validation. The cache validation system receives cache requests, and identifies requested cache entries as stale in response to a requested cache entry satisfying a cache invalidation rule. Responsive to a rule insertion request specifying a new rule that, when added to an existing set of rules, would exceed a rule-set capacity limitation, a revised rule is generated that is at least as broad as the union of one or more subsumable rules. Each of the one or more subsumable rules is either the new rule or a rule in the existing set of rules. The set of rules is then updated, without exceeding the capacity limitation, to include the revised rule and to exclude the one or more rules subsumed into the revised rule. If not included in the revised rule, the new rule is included in the updated set of rules.

20 Claims, 6 Drawing Sheets

(56) References Cited

OTHER PUBLICATIONS

Che, H., Wang, Z., & Tung, Y. (2001). Analysis and design of hierarchical web caching systems. In INFOCOM 2001. Twentieth Annual Joint Conference of the IEEE Computer and Communications Societies. Proceedings. IEEE (vol. 3, pp. 1416-1424). IEEE.
Distributed caching algorithms for content distribution networks01D Borst, S., Gupta, V., & Walid, A.—INFOCOM, Mar. 2010, Proceedings IEEE (pp. 1-9). IEEE.
Teng, W. G., Chang, C. Y., & Chen, M. S. (2005). Integrating web caching and web prefetching in client-side proxies. Parallel and Distributed Systems, IEEE Transactions on, 16(5), 444-455.

* cited by examiner

METHODS AND SYSTEMS FOR RULE-BASED FLEXIBLE CACHE INVALIDATION

BACKGROUND

A cache is an auxiliary set of data entries. A cache entry includes a static copy of a data object corresponding to a source data object. Typically, a cache is used to temporarily store data closer to a data consumer than a data source, or to temporarily hold data that is generated as needed. Multiple caches may be used cooperatively and/or in a hierarchical manner. Example uses for a cache include, but are not limited to, using a cache to accelerate access by a computer processor to data held in a comparatively slower storage medium, e.g., a hard drive; using a cache to shield a database query engine from redundant queries; and using a cache to manage distribution of data in a content delivery network, e.g., a distributed Web cache in the Internet. It is typically less computationally expensive, or resource demanding, to use a cache than to directly fetch a requested data object from an original source.

When an object is first loaded into a cache, the object data is an identical copy of its corresponding source data. However, the cached data object may become invalid. For example, a cache entry may become invalid when the source data is modified, deleted, or replaced. A cache entry may be invalid if the entry has expired, if access is restricted, or if the entry is otherwise disqualified. Some cache implementations purge data entries that are identified as invalid.

In some typical cache implementations, the cache uses a replacement policy to select particular cache entries to remove from the cache. For example, if a new cache entry requires more space than is presently available, some cache implementations will use a replacement policy to select entries, and remove the selected entries to create space for the new entry. Examples of replacement policies include the most recently used "MRU" policy, the least recently used "LRU" policy, and the segmented least recently used "SLRU" policy. In each of these replacement policies, the cache implementation keeps track of access or usage statistics for cache entries. When the cache is full, the cache entry, or entries, identified by the policy can be cleared from the cache to make space for a new cache entry. In MRU, the most recently used entry is removed; in LRU, the least recently used entry is removed; and in SLRU, the least recently used entry in a "probationary" segment is removed. Cache entries are promoted out of the probationary segment after satisfying a utility criteria, e.g., multiple requests for the same cache entry. Stale cache entries may be demoted back to the probationary segment. If a removed cache entry is later requested, after having been cleared from the cache, a new cache entry can be created by re-fetching the source data from either another cooperative cache or from a data source. Other replacement policies, or eviction policies, may also be used.

SUMMARY

In one aspect, the disclosure relates to a system that includes a computer readable memory storing a set of rules and a cache configured to receive a cache request, to identify a requested cache entry corresponding to the cache request, and to determine that the requested cache entry is stale in response to at least one of the rules existing in the stored set of rules being satisfied by the requested cache entry. The system includes one or more processors configured to accept a rule insertion request, the rule insertion request specifying a new rule not present in the existing set of rules. The one or more processors are further configured to generate, responsive to a determination that adding the new rule to the existing set of rules will exceed a rule-set capacity limitation, a revised rule that is at least as broad as the union of one or more subsumable rules, where each of the one or more subsumable rules is either the new rule or a rule in the existing set of rules. The one or more processors are configured to then update the set of rules to be a modified set of rules that does not exceed the capacity limitation. The modified set of rules includes the revised rule and excludes the one or more subsumable rules.

In one aspect, the disclosure relates to a method. The method includes storing, by a cache validation system, a set of rules in a computer readable memory and receiving, by the cache validation system, a cache request. The method includes identifying a requested cache entry corresponding to the cache request and determining that the requested cache entry is stale in response to at least one of the rules existing in the stored set of rules being satisfied by the requested cache entry. The method includes accepting, by the cache validation system, a rule insertion request specifying a new rule not present in the an existing set of rules stored as the set of rules in the computer readable memory. The method includes generating, by the cache validation system, responsive to a determination that adding the new rule to the existing set of rules would exceed a rule-set capacity limitation, a revised rule that is at least as broad as the union of one or more subsumable rules, where each of the one or more subsumable rules is either the new rule or a rule in the existing set of rules. The method includes updating, by the cache validation system, the set of rules to be a modified set of rules that does not exceed the capacity limitation, wherein the modified set of rules includes the revised rule and excludes the one or more subsumable rules.

In one aspect, the disclosure relates to a non-transitory computer-readable medium storing instructions that, when executed by one or more computing processors, cause the one or more computing processors to store a set of rules in a rewritable computer-readable memory and to receive a cache request. The instructions, when executed, cause the one or more computing processors to identify a requested cache entry corresponding to the cache request and to determine that the requested cache entry is stale in response to at least one of the rules existing in the stored set of rules being satisfied by the requested cache entry. The instructions, when executed, further cause the one or more computing processors to accept a rule insertion request specifying a new rule not present in the existing stored set of rules; generate, responsive to a determination that adding the new rule to the existing set of rules would exceed a rule-set capacity limitation, a revised rule that is at least as broad as the union of one or more subsumable rules, where each of the one or more subsumable rules is either the new rule or a rule in the existing set of rules; and update the stored set of rules to be a modified set of rules that does not exceed the capacity limitation, wherein the modified set of rules includes the revised rule and excludes the one or more subsumable rules.

BRIEF DESCRIPTION OF THE DRAWINGS

The above and related objects, features, and advantages of the present disclosure will be more fully understood by reference to the following detailed description, when taken in conjunction with the following figures, wherein.

Like reference numbers and designations in the various drawings indicate like elements.

DETAILED DESCRIPTION

Figure 1:
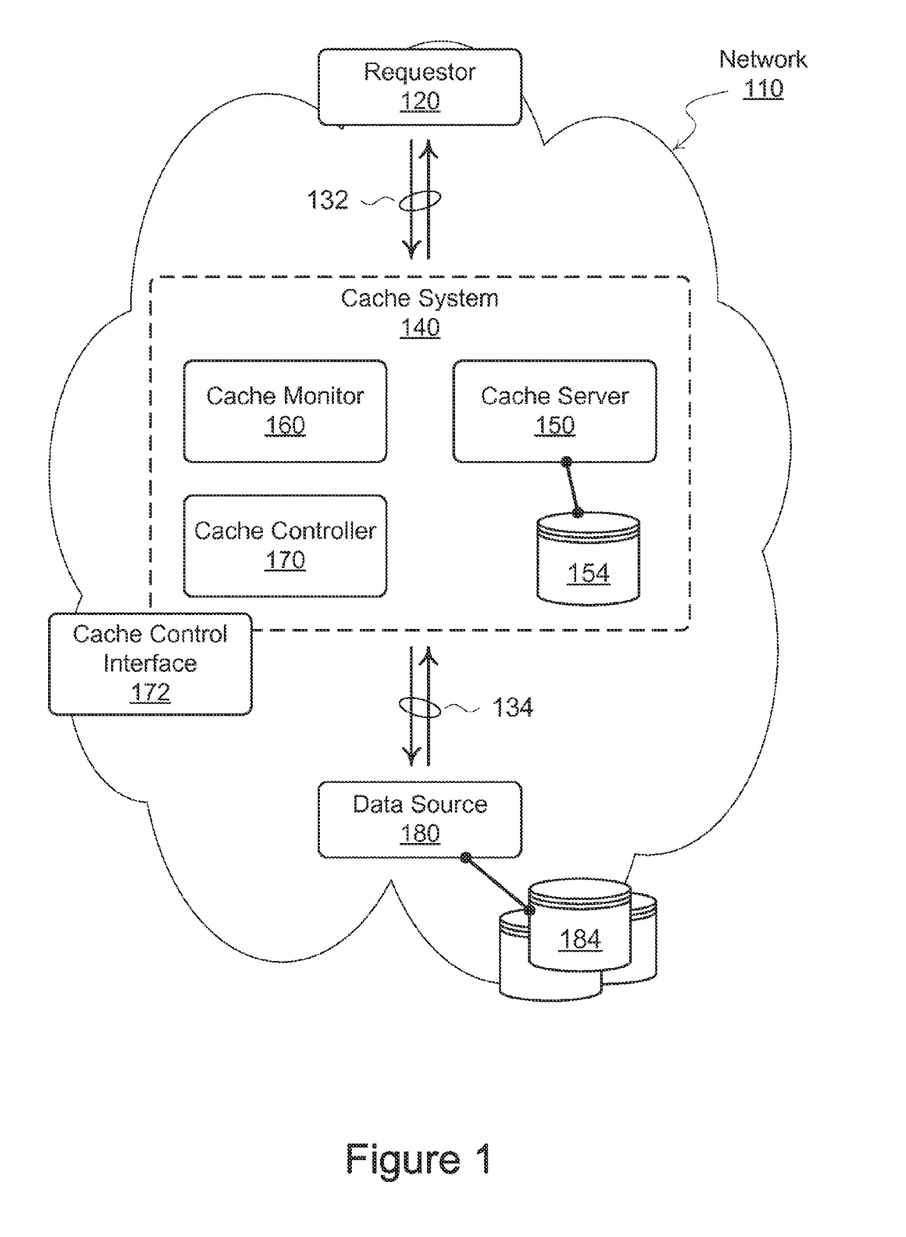
FIG. 1 is a block diagram of an example environment that includes a cache system.

FIG. 1 illustrates an example environment that includes a cache system 140 in a network 110. The cache system 140 includes a cache controller 170, a cache monitor 160, and a cache server 150. The cache system 140 receives a request for data from a requestor 120, and responds to the request with data stored in cache memory 154. If the requested data is not present in cache memory 154, the cache system 140 obtains the requested data from a data source 180, which may be an original data source or another cache. The cache system 140 interacts with the requestor 120 via a network channel 132, and the cache system 140 interacts with the data source 180 via another network channel 134. The two network channels 132 and 134 may be in the same network (e.g., the illustrated network 110) or in distinct networks. For example, the channel 134 to the data source 180 may be in a private network unavailable to the requestor 120. The cache system 140 is controlled via a cache control interface 172, which may be local to the cache system 140 or may be connected to the cache system 140 via a network, e.g., the illustrated network 110. The network 110 may be one or more interconnected sub-networks or autonomous systems, for example, the Internet. The illustrated environment is presented only as an example, and is not meant to be limiting. The cache systems described, and similar cache systems, can be implemented in other contexts including, but not limited to, distributed hierarchical cache systems, databases, distributed storage, hardware memory systems, content delivery networks, and various types of data centers.

Referring to FIG. 1 in more detail, the components of the illustrated cache system 140, including the cache controller 170, the cache monitor 160, and the cache server 150, can be implemented individually or in various combinations with each other. In some implementations, one or more components of the cache system 140 are implemented as an application-specific integrated circuit ("ASIC"). In some implementations, one or more components of the cache system 140 are implemented as computer executable instructions for execution on one or more general purpose processors.

The cache server 150 stores cache entries in, and retrieves stored cache entries from, the cache memory 154. The cache memory 154 may be any device suitable for storing computer readable data. Examples include, but are not limited to, magnetic media devices such as hard disk drives and tape drives, optical media devices such as writeable CD-ROM, DVD, and BluRay® disc drives, and semiconductor memory devices such as EPROM, EEPROM, SRAM, and flash memory devices. A cache system 140 may have any number of cache memory devices 154. In some implementations, the cache memory 154 is distributed. In some implementations, the cache memory 154 is a storage area network (SAN). In some implementations, the cache memory 154 is a network attached storage (NAS).

The cache monitor 160 receives requests for data objects, e.g., from a requestor 120 via a channel 132, and determines if the request can be satisfied using data stored in cache memory 154 or if a corresponding request needs to be made to another data source 180. The request can be any form of data request that is appropriate for the particular cache implementation. In some implementations, the request identifies a specific data object. In some implementations, the request is a memory address. In some implementations, the request is a file name. In some implementations, the request is a database query string. In some implementations, the request is a uniform resource identifier ("URI"), e.g., a uniform resource locator ("URL"). In some implementations, the URL may include protocol information, domain information, location path information, script parameters such as a query string, and/or a fragment identifier. In some implementations, the cache monitor 160 determines that the request cannot be satisfied, and rejects the request. In some implementations, the cache monitor 160 processes the request to determine if it can be satisfied locally by the cache system 140. In some implementations, the cache monitor 160 identifies a cache key corresponding to the request. In some implementations, the cache monitor 160 applies a hashing algorithm (e.g., MD5) to the request, or to a portion of the request, to generate a hash value corresponding to the request. The cache monitor 160 then uses the hash value as an identifier, e.g., as a cache key, for a cache entry corresponding to the requested data object. In some implementations, the cache server 150 locates a cache entry corresponding to the requested data object, and the cache monitor 160 determines if the cache entry is valid. If the cache entry is not valid, or not found, then the cache system 140 can send a request to another data source 180 to obtain a valid copy of the requested data object.

The cache monitor 160 uses a set of cache invalidation rules to determine if a request for a data object can be satisfied, if it can be satisfied locally, and/or if a local entry is valid and suitable for use in responding to the request. In some implementations, the rules are stored in the cache memory 154. In some implementations, the rules are stored in memory other than the cache memory 154, e.g., a dedicated semiconductor memory device such as an EPROM, EEPROM, SRAM, or flash memory device not illustrated in FIG. 1, or any other form of computer memory. In some implementations, the memory allocation for the rules is limited or constrained.

In some implementations, the cache monitor 160 determines, based on application of one or more rules in the set of cache invalidation rules, that a request for a data object cannot be satisfied by a corresponding cache entry in the cache memory 154, for example, because the corresponding cache entry is invalid. In some implementations, the cache server 150 maintains usage data for a cache replacement policy. For example, in some implementations, the usage data can be used to identify the least recently used ("LRU") cache entries or the most recently used ("MRU"), or to categorize the cache entries by segments (e.g., as may be done in an SLRU replacement policy). In some such implementations, the usage data is not updated if the cache monitor 160 determines that a request for a data object cannot be satisfied by a corresponding cache entry in the cache memory 154. In some implementations, if the cache monitor 160 determines that a request for a data object cannot be satisfied by a corresponding cache entry in the cache memory 154, then the cache server 150 purges the corresponding cache entry. In some implementations, a cache entry identified as invalid is flagged to be purged at a later time. Purging can include one or more of removing a data entry from an index of data entries, deleting a data object, overwriting a data object, or marking a data object as invalid.

The cache controller 170 manages the cache system 140. A cache control interface 172 interacts with the cache controller 170 to manage configuration settings, administrative functions, and the cache invalidation rules used by the cache monitor 160. In some implementations, the cache control interface 172 is used to submit new cache invalidation rules to the cache system 140. If addition of the new rule would exceed a limitation on the set of cache invalidation rules, the cache system 140 modifies the set of cache invalidation rules using one or more revised rules. The revised rules replace one or more of the cache invalidation rules, and invalidate at least the same cache entries that would be invalided by the rules replaced. In some instances, the revised rules may also invalidate additional cache entries. In some implementations, the new rule may be replaced by a revised rule. In some implementations, a revised rule is generated by compressing a rule. In some implementations, a revised rule is generated by merging or combining two or more rules. In some implementations, the cache monitor 160 maintains the set of cache invalidation rules. In such implementations, when a new rule is received from the cache controller 170 that would exceed a limitation on the set of cache invalidation rules, the cache monitor 160 generates the revised rules and updates the set of cache invalidation rules.

The requestor 120 may be any device submitting a request for a data object. The requestor 120 may be, for example, another cache system, an intermediary device, or a user device. The data source 180 may be any device able to satisfy the request for the data object. The data source 180 may be, for example, another cache system, an intermediary device, or a data server device such as a database, a data store, or a data center server. In some implementations, the data source 180 is an authoritative source. In some implementations, the cache system 140 receives requests from the requestor 120 meant for the data source 180, and the data source 180 only receives a corresponding request when the cache system 140 is unable to satisfy the initial request independently. That is, the cache 150 receives the request for data from the requestor 120, and responds to the request with data stored in cache memory 154. When the requested data is not present in cache memory 154, or when the corresponding cache entry is identified as invalid by the cache monitor 160, then the cache system 140 obtains the requested data from the data source 180. In some implementations, the data source 180 revalidates an existing cache entry without transmitting the contents of the revalidated cache entry. In some implementations, the data source 180 periodically pushes unrequested data to the cache system 140.

In some implementations, the data source 180 includes, or is linked to, one or more source memory devices 184. Examples of source memory devices 184 include, but are not limited to, magnetic media devices such as hard disk drives and tape drives, optical media devices such as writeable CD-ROM, DVD, and BluRay® disc drives, and semiconductor memory devices such as EPROM, EEPROM, SRAM, and flash memory devices. There may be any number of source memory devices 184. In some implementations, the source memory devices 184 are distributed. In some implementations, the source memory devices 184 include a storage area network (SAN). In some implementations, the source memory devices 184 include a network attached storage (NAS).

Figure 2:
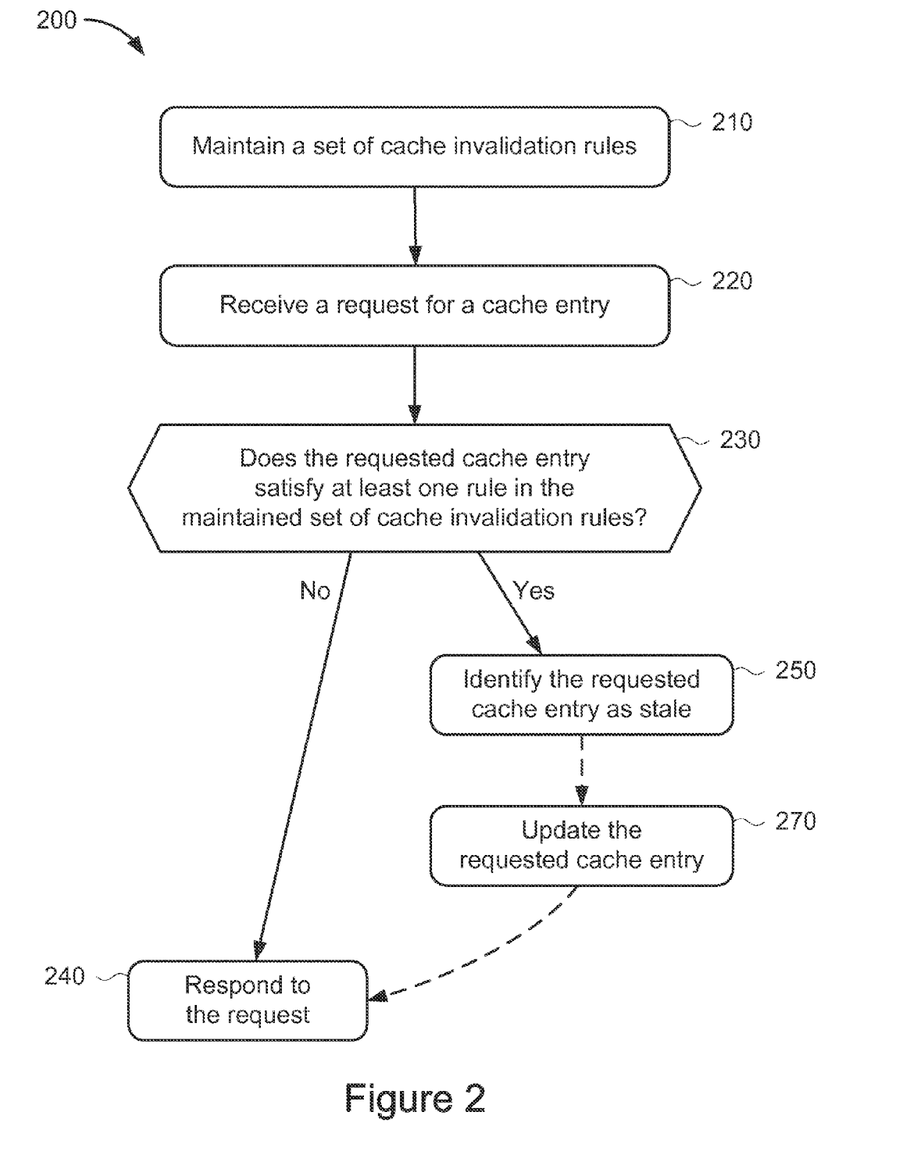
FIG. 2 is a flowchart for managing cache requests.

FIG. 2 is a flowchart for a method 200 for managing cache requests. In broad overview, the method 200 includes maintaining, by a cache system, a set of cache invalidation rules (stage 210). The cache system receives a request for a cache entry (stage 220) and determines if the requested cache entry satisfies at least one rule in the maintained set of cache invalidation rules (stage 230). If the requested cache entry does not satisfy any of the cache invalidation rules, then the cache system responds to the request with data from the valid cache entry (stage 240). Otherwise, the cache system treats the request as a request for an invalid cache entry and identifies the requested cache entry as stale. (stage 250). In some implementations, the cache system updates the cache from another source 180, e.g., from another cache or authoritative source (stage 270) and then subsequently responds to the request using data from the updated cache entry (stage 240). In various implementations, as described further below, the update may include a new copy of the content in stale cache entry or it may include an update to an attribute of the stale entry, revalidating the cache entry.

Figure 4A:
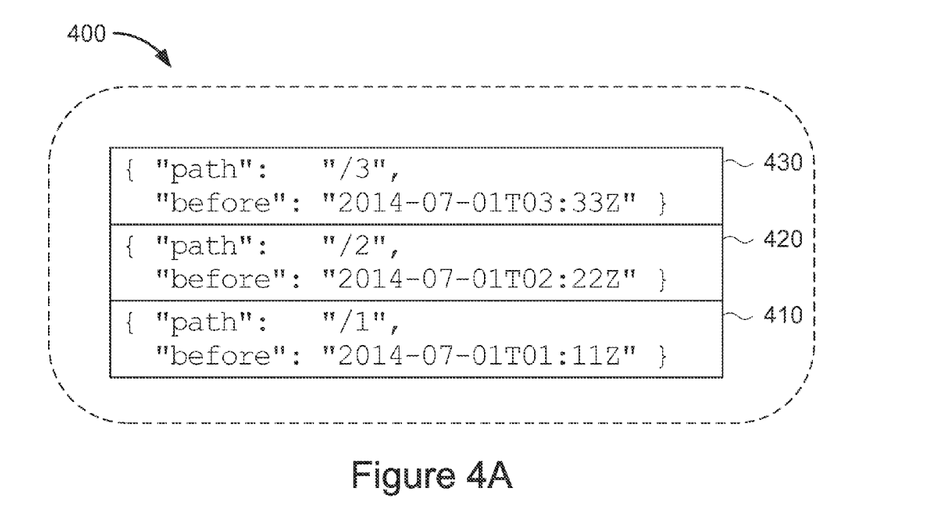
FIGS. 4A and 4B are block diagrams of example cache invalidation rules.
Figure 4B:
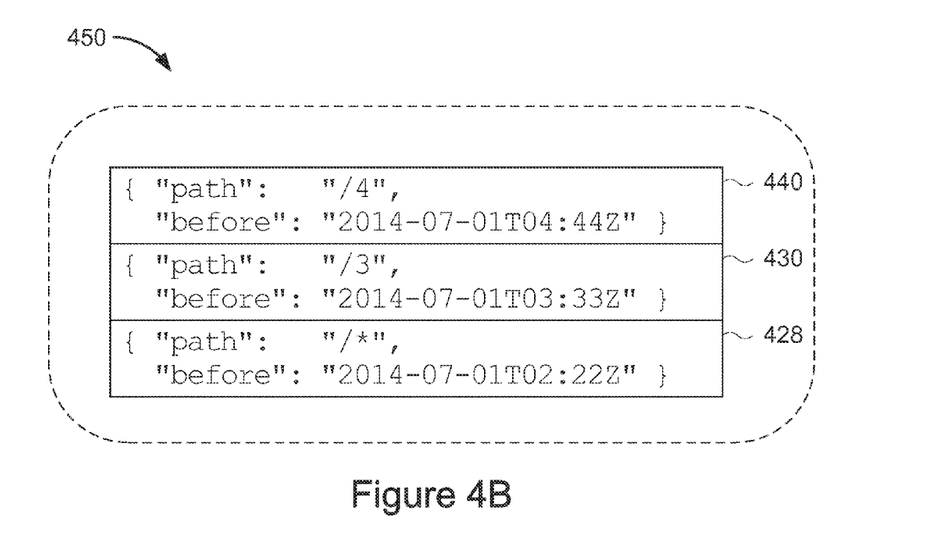
Figure 5:
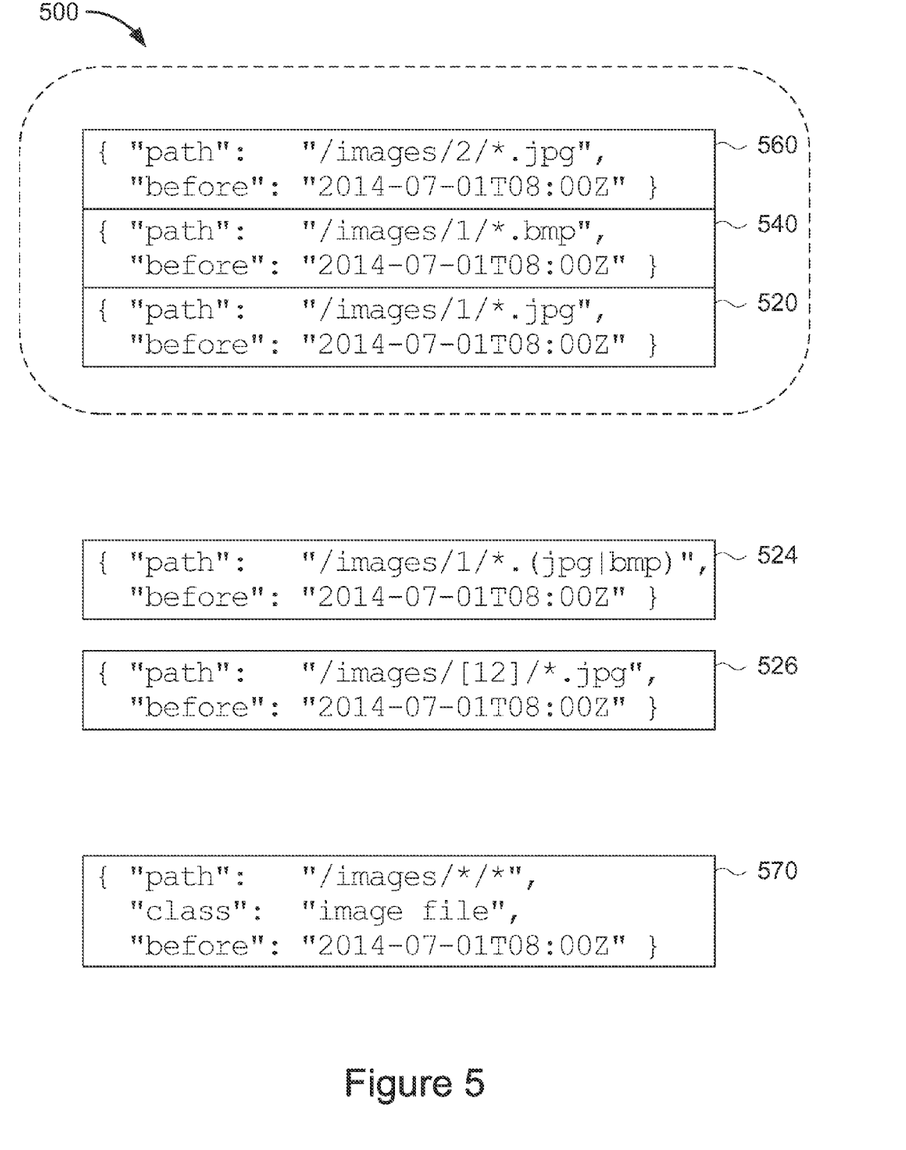
FIG. 5 is a block diagram of example cache invalidation rule combinations.

Referring to FIG. 2 in more detail, the method 200 includes maintaining, by a cache system, a set of cache invalidation rules (stage 210). One suitable cache system 140 is illustrated in FIG. 1. Example sets of cache invalidation rules are shown in FIGS. 4A, 4B, and 5. In some implementations, there are constraints on the size, number, or complexity of the rules. The constraints may be designed, for example, to confine the rules to a limited memory allocation, to limit the number of rules to be applied to incoming requests, and/or to ensure fast application of the cache invalidation rules. In some implementations, the rules are maintained by a cache monitor, e.g., the cache monitor 160 illustrated in FIG. 1.

When the cache system receives a request for a cache entry (stage 220), it determines if the requested cache entry satisfies at least one rule in the maintained set of cache invalidation rules (stage 230). For example, referring to FIG. 1, a requestor 120 may transmit a request for a data object via a communication channel 132. The cache system 140 receives the request and a component of the cache system 140, e.g., the cache monitor 160, applies the cache invalidation rules to determine if the request is for a cache entry that is no longer valid. In some implementations, when the cache system 140 receives a request, the request is resolved into a cache key corresponding to a cache entry. The cache system 140 compares each cache invalidation rule to one or more of the original request, the resolved cache key, the metadata included in (or associated with) the corresponding cache entry, and the content data of the cache entry.

A cache invalidation rule can include one or more parameters for identifying whether a request is for an invalidated cache entry. In some implementations, a rule is a combination of an event horizon and a pattern satisfied by a request string or a data object identifier, such that the validation restriction is only applied to requests for cache entries both associated with an event date or sequence number that falls before the event horizon specified in the rule and also satisfying the pattern as specified in the rule. An event horizon, as used herein, is any form of time or sequence threshold such that objects can be associated with an event before, coincident, or after the event threshold in a logical ordering of events. An event horizon may be expressed, for example, as a timestamp, as a sequence number, as a vector of sequence numbers, or in any other suitable manner. In some implementations, an event horizon is used to determine a "happens before" relationship for data object creation, insertion, or last use. A variety of metadata may be considered by rules, including, for example, usage statistics, content size, content type, or content source.

In some implementations, a cache invalidation rule parameter specifies a pattern, e.g., a regular expression, where the pattern is matched by request strings for cache entries designated by the rule as invalid. In some implementations, the request is processed to identify the data object requested. For example, the request may be converted from a request format to an internal object identifier format such as a cache key. In some implementations, a request string is hashed to produce a hash value that is then used as a cache key. In some implementations, a request string is compared against a table (or other data structure, such as a tree, a trie, a heap, or an ordered set) of cache keys. In some such implementations, a hash value for the request string is used as an index into the table of cache keys. In some implementations, the resulting internal identifier for the requested data object, e.g., the cache key, is then compared to a cache invalidation rule pattern. In some implementations, the invalidation rules can specify names or identifiers, or patterns matched by names or identifiers, for cache entries that are invalid. In some implementations, the invalidation rules can specify one or more patterns to be satisfied by content data for the cache entry. For example, a rule may invalidate all cache entries (satisfying other parameters of the rule) that include a particular phrase (e.g., "candidate Smith"). The invalidation rules may identify a specific cache entry, or may identify a family or directory hierarchy of cache entries. In some implementations, an invalidation rule may specify multiple patterns or regular expressions, each for a different purpose. For example, a rule may specify a first pattern to be satisfied by a cache entry identifier and a second pattern to be satisfied by the contents of the cache entry. In some implementations, the purpose of each pattern or regular expression is specified or indicated in the rule. In some implementations, multiple patterns may be specified in a rule for the same purpose. For example, a rule may include multiple patterns to be satisfied by content data for the cache entry, e.g., a first pattern for text required to be present in the content data and a second pattern for text required not to be present in the content data.

In some implementations, the invalidation rules can specify a time-based or sequencing threshold parameter (the event horizon) such as an insertion date, creation date, version number, or cache-insertion sequence number (e.g., a logical timestamp such as a Lamport timestamp). For such rules, cache entries having corresponding parameter values that happened before (i.e., are "older" than) the threshold are invalid. In some implementations, if a received request is a request corresponding to a cache entry that has an event time, or sequence number, that is prior to (i.e., happens before) a rule's event horizon, then the rule applies to the request. A time can be expressed as a specific time or as an offset relative to the current time. If all of the parameters of the applied rule are satisfied by the requested cache entry, then the request is for an invalid cache entry.

In some implementations, a rule may specify a data type or classification. For example, a rule may be applicable to a specific image file type (e.g., JPEG) or to the class of all image formats (including, for example, JPEG, BMP, TIFF, PNG, GIF, MPO, CD5, STL, PSD, RAW, etc.). As another example, a rule may be applicable to a specific audio file type (e.g., WAV) or to the class of all audio/video formats (including, for example, WAV, AIFF, M4A, MPEG, MP3, M4A, AAC, RM, WMA, WMV, FLA, SWF, MOV, AVI, OGG, etc.). In some implementations, the data classification is indicated using a non-standard notation specific to the implementation of the cache system. In some implementations, a cache administrator can use a cache controller interface to create custom data classifications aggregating an enumerated list of data types. For example, an administrator might define a custom class for specific executable file and script types, e.g., files with an EXE, BAT, CGI, PL, or RB extension. In some implementations, a rule may specify any characteristic of cache entries that are represented in metadata associated with the cache entries.

In some implementations, the rules are applied in a logical order. In some implementations, the rules are stored in a data structure based on one or more attributes examined by the invalidation rules, e.g., by event horizon. In some implementations, attributes of the requested cache entry (or the request itself) are compared against a trie (i.e., a prefix tree) containing rules or rule components. Attributes may include, for example, the request string, an identifier for the cache entry, a cache key associated with the cache entry, metadata associated with the cache entry, content data of the cache entry, a cache entry type, a cache entry classification, a cache segment qualifier, a usage statistic, a group membership, a cache insertion time, an object creation time, an event occurrence time, a logical sequence number, or a Lamport sequence number. In some implementations, the rules are parsed into rule components and the rule components are structured into data structures for comparison to requested cache entries. For example, in some implementations, each rule includes a pattern for matching a path to a cache entry. These path patterns are parsed from the rules and loaded into a trie. When a cache request is received, the path to the cache entry is compared to the trie to identify rules applicable to the requested cache entry.

If the requested cache entry does not satisfy any of the cache invalidation rules, then the cache system responds to the request with data from the valid cache entry (stage 240). The cache system 140 obtains the requested data from cache memory 154 and sends a response to the requestor 120. Referring to FIG. 1, in some implementations, the cache monitor 160 determines that a request is not for an invalid object and the cache server 150 then responds to the request with a data object from cache memory 154. In some implementations, the cache system 140 maintains usage data, e.g., a last access time, for each data object in cache. When the cache system 140 responds to a request with a valid cached data object, the usage data is updated. In some implementations, the cache system 140 also updates cache segmentation data.

Referring to FIG. 2, if the requested cache entry does satisfy one of the cache invalidation rules, then the cache system identifies the requested cache entry as stale (stage 250) and updates the cache (stage 270). In some implementations, when a cache entry is determined to be stale, the cache system 140 then attempts to update the cache by requesting the content from another data source 180.

In some implementations, the cache system will update the cache with newly obtained response data as a new cache entry. In some implementations, the cache system will update the requested (stale) cache entry with the newly obtained response data (stage 270).

In some implementations, the other data source 180 treats a request for content as a cache miss at the cache system 140, i.e., a request for content resulting from an identification that a cache entry is stale is handled in the same manner. In some other implementations, the other data source 180, in response to a request for content deemed stale by the cache system 140 can verify whether the previously cached content is in fact stale. If the other data source 180 also finds the previously cached content to be stale, the other data source 180 provides updated content, if available, to be stored at the cache system 140 and to be returned to the requestor. If the other data source 180 determines that the content deemed stale by the cache system 140 is still valid, the other data source 180 responds to the cache system 140 with a revalidation instruction, without forwarding a copy of the requested content. The cache system 140, in response to the revalidation instruction updates the stale cache entry by updating one or more attributes of the cache entry (e.g., a cache insertion date or a sequence number), such that the request cache entry is no longer considered stale, i.e., such that the updated cache entry fails to satisfy a cache invalidation rule. The requested cache entry can then be returned as before, in stage 240.

In some implementations, upon the cache system 140 rejecting the request for a stale cache entry as a request for invalid data, or upon receipt of updated content from another data source 180 (as opposed to receiving a revalidation instruction), the cache system 140 purges any previously stored data objects in the cache memory 154 corresponding to the request. In some implementations, the cache system 140 marks the data objects in the cache memory 154 corresponding to the request for later purging, e.g., during a periodic purge cycle. In some implementations, the cache system 140 maintains usage data, e.g., a last access time, for each data object in cache. When the cache system 140 determines that a request is for an invalid cached data object, the usage data is not updated. As a result, the invalid cached data object may eventually be removed by a replacement policy implemented in the cache system 140 as necessary to create space for new cache entries.

Figure 3:
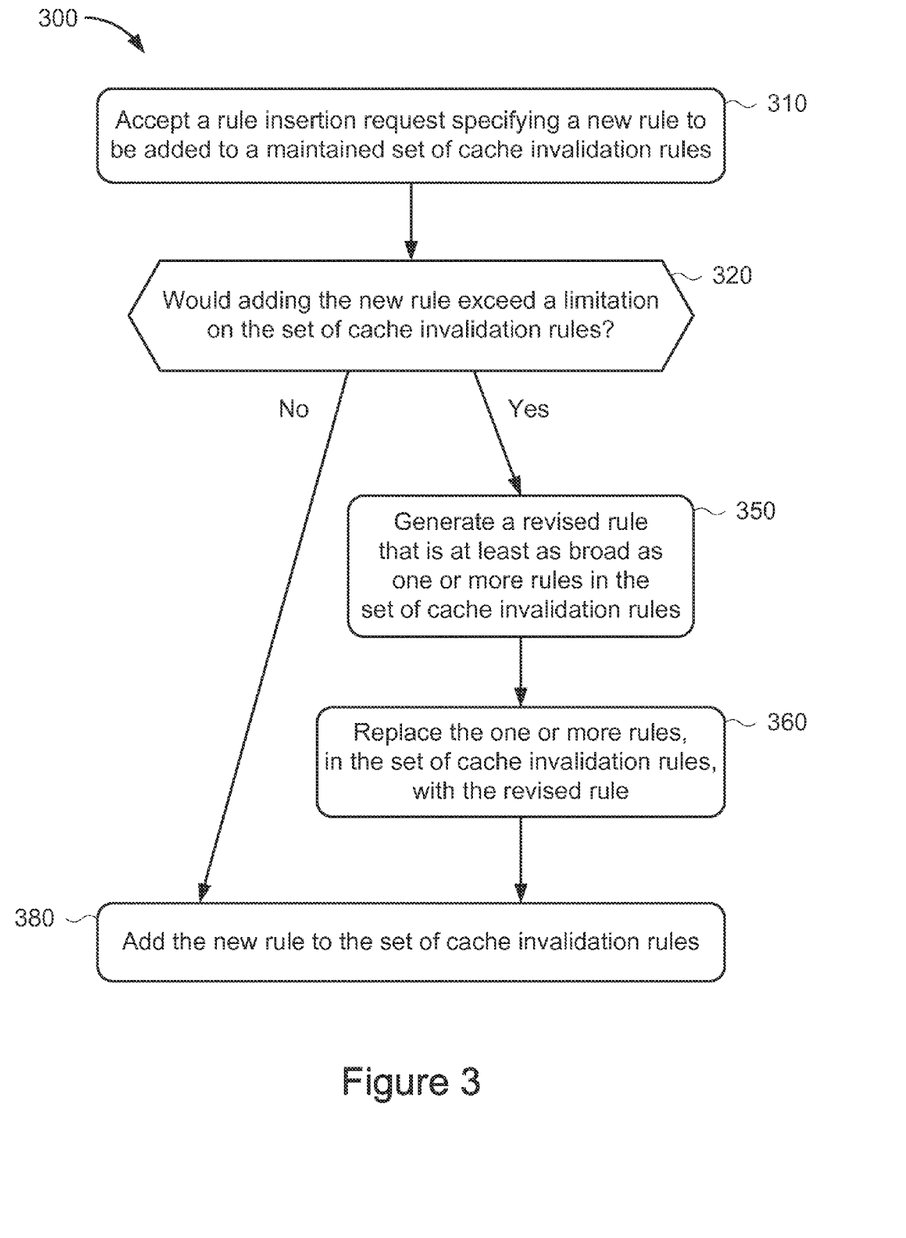
FIG. 3 is a flowchart for managing cache invalidation rules.

FIG. 3 is a flowchart for a method 300 for managing an addition to the cache invalidation rules. In broad overview, the method 300 begins with a cache system accepting a rule insertion request specifying a new rule to be added to a maintained set of cache invalidation rules (stage 310). The cache system determines whether adding the new rule would exceed a limitation on the set of cache invalidation rules (stage 320). If adding the new rule would exceed a limitation on the set of cache invalidation rules, then the cache system generates a revised rule that is at least as broad as one or more rules in the set of cache invalidation rules (stage 350) and replaces the one or more rules with the revised rule (stage 360). When adding the new rule will not exceed a limitation on the set of cache invalidation rules, the cache system adds the new rule to the set of cache invalidation rules (stage 380).

Referring to FIG. 3 in more detail, the method 300 begins with a cache system accepting a rule insertion request that specifies a new rule to be added to a maintained set of cache invalidation rules (stage 310). In some implementations, an administrator submits the new rule using a cache control interface 172. In some implementations, the new rule is generated automatically, e.g., in response to an event or according to a schedule. For example, in some implementations, the cache system 140 generates a cache invalidation rule to invalidate all cached data objects associated with an older version of a data object when a newer version of the data object is inserted into the cache.

The cache system determines whether adding the new rule would exceed a limitation on the set of cache invalidation rules (stage 320). In some implementations, the number of rules, the complexity of the rules, and/or the memory allocated for representation of the rules may be restricted. The limitation can be on individual rules and/or the total set of rules. For example, in some implementations, cache invalidation rule sets are limited to at most ten rules with a total of at most one kilobyte (1024 bytes) of path-matching patterns. Any particular limitation may be used. In some implementations, the number of rules allowed is between ten and one hundred, with a maximum memory requirement of up to two or three megabytes of storage for the rules. In some implementations, the number or size of the rules is based on physical limitations of the memory hardware used to implement the cache system. In some implementations, the complexity of the rules is limited based on the capabilities of processor(s) used to implement the cache system. In some implementations, the number or size of the rules is restricted to control the complexity of the rules. If adding the new rule to the set of cache invalidation rules, without removing any rules, would exceed one or more of the restrictions on the set of rules, then one or more rules need to be compressed, two or more rules need to be combined, or at least one rule needs to be removed so that adding the new rule would not exceed the limitation.

If adding the new rule would exceed a limitation on the set of cache invalidation rules, then the cache system generates a revised rule that is at least as broad as one or more rules in the set of cache invalidation rules (stage 350) and replaces the one or more rules with the revised rule (stage 360). The cache system 140 identifies one or more rules to replace. The rules to be replaced are then subsumed into a revised rule, such that the revised rule is at least as broad as the union of the replaced subsumable rules. In some implementations, the rule(s) in a set with event horizons that happen the earliest (that is, before the event horizons of the remaining rules) are replaced with a broader coalesced rule that ensures all cache entries that would have been invalidated by the replaced rule(s) are still invalidated. In some implementations, a revised rule is generated using an event horizon selected to be after, or coincident with, corresponding event horizons in each of the one or more rules to be replaced by the revised rule. FIGS. 4A and 4B illustrate generating a revised rule based on an event horizon in this manner. In some implementations, the cache system identifies multiple rules applicable to file types for which there is a super-set classification. For example, if there is a rule specific to JPEG files and another rule specific to BMP files, these rules can be combined into a rule applicable to all image files, as a classification. FIG. 5 illustrates generating a revised rule in this manner. Rules for other file types and classifications, e.g., audio/video media files, can be combined in a similar way. In some implementations, the cache system identifies a rule with a long pattern parameter, and replaces the rule with a shorter pattern parameter. A revised rule can be more inclusive than the rules that it replaces. That is, valid cache entries may be invalidated by the revised rule. The cache system removes, from the set of cache invalidation rules, the one or more rules used to create the revised rule, and replaces them in the set with the revised rule. In some implementations, the cache system iteratively replaces rules until the new rule can be added without exceeding any of the limitations on the set of cache invalidation rules. In some implementations, the new rule is not added to the set of cache invalidation rules. Instead, a revised rule that is broader than the new rule is generated and used.

When adding the new rule will not exceed a limitation on the set of cache invalidation rules, the cache system adds the new rule to the set of cache invalidation rules (stage 380). In some implementations, the new rule exceeds the limitations on its own, and is replaced with a revised rule. For example, if a limitation is for each rule to have a pattern with no more than 144 bytes, then a new rule with a pattern exceeding 144 bytes can be replaced with a revised rule compliant with the limitation. The revised rule may invalidate more cache entries than the rule it replaces.

In some implementations, a revised rule is generated using a composite regular expression satisfied by anything satisfying corresponding regular expressions in each of the one or more rules to be replaced by the revised rule. In some implementations, a composite regular expression is generated from source expressions by identifying elements in common across the source expressions. For example, if each regular expression includes a uniform string of characters present in each of the source regular expressions, then a composite regular expression might include the uniform string of characters and a regular instruction parameter broadly matching any string that would satisfy the remaining diverse portions of each source regular expression. In some implementations, a composite regular expression is generated by identifying elements that are not in common across the source expressions. For example, if a discrete portion of each regular expression is identified as diverse but complementary, the portions can be matched in the composite regular expression with either a wildcard or an inset regular expression disjunctively listing the discrete portions from each respective source expression.

FIGS. 4A and 4B are block diagrams of example cache invalidation rules. FIG. 4A illustrates a set 400 of three cache invalidation rules 410, 420, and 430. Each illustrated cache invalidation rule includes label/value pairs for a cache entry path and for an event horizon. The first example rule 410, {"path": "/1", "before": "2014-07-01T01:11Z" }, indicates that a request for an object in the cache older than Jul. 1, 2014, 1:11 AM GMT (Zulu), where the object has a path name matched by the pattern "/1," is a request for an invalid object. Likewise, the second rule 420, {"path": "/2", "before": "2014-07-01T02:22Z" }, indicates that a request for an object in the cache older than Jul. 1, 2014, 2:22 AM GMT, where the object has a path name matched by the pattern "/2," is a request for an invalid object. And the third rule 430, {"path": "/3", "before": "2014-07-01T03:33Z" }, indicates that a request for an object in the cache older than Jul. 1, 2014, 3:33 AM GMT, where the object has a path name matched by the pattern "/3," is a request for an invalid object. According to the illustrated set 400 of example cache invalidation rules, any cache entry identified by a request satisfying one of the rules 410, 420, or 430 in the set 400 should be considered invalid, and the request should result in a cache miss. If there is a limit of three rules in the set 400 of cache invalidation rules, then adding a fourth rule would exceed the limit.

FIG. 4B illustrates a set 450 of cache invalidation rules resulting from the addition of a fourth rule 440 to the set 400 of cache invalidation rules shown in FIG. 4A, assuming a limit of three cache invalidation rules in a set. A fourth rule 440 can be added only if one of the rules 410, 420, or 430, were removed, or if at least two rules were replaced with a revised rule. FIG. 4B shows a revised rule 428 resulting from a merger of the first and second rules 410 and 420 shown in FIG. 4A.

In particular, in FIG. 4B, the new rule 440, {"path": "/4", "before": "2014-07-01T04:44Z" }, indicates that a request for an object in the cache older than Jul. 1, 2014, 4:44 AM GMT, where the object has a path name matched by the pattern "/4," is a request for an invalid object. The example revised rule 428, {"path": "/*", "before": "2014-07-01T02: 22Z" }, indicates that a request for an object in the cache older than Jul. 1, 2014, 2:22 AM GMT (Zulu), where the object has a path name matched by the pattern "1*," where "*" is a wildcard matched by anything, is a request for an invalid object. This broad rule 428 will invalidate all cache entries that would have been invalidated by the first and second rules 410 and 420 that it replaces. It also potentially invalidates some cache entries that would not have been considered invalid based on the original rules, e.g., objects with path "/1" inserted between 01:11Z and 02:22Z on Jul. 1, 2014, or objects with paths other than "/1" or "/2" older than the identified event horizon, 2014-07-01T02:22Z. The modification to the set of cache invalidation rules creates space within the three-rule limitation for the new rule 440, and leaves the remaining rule 430 unchanged.

FIGS. 4A and 4B illustrate one example of replacing rules with a revised rule 420. The revised rule merges, or coalesces, the replaced rules 410 and 420. Other combinations are also possible.

FIG. 5 is a block diagram of example combinations of cache invalidation rules.

FIG. 5 illustrates a set 500 of three cache invalidation rules 520, 540, and 560. Each illustrated cache invalidation rule includes label/value pairs for a cache entry path and for an event horizon. The first example rule 520, {"path": "images/1/*.jpg", "before": "2014-07-01T08:00Z" }, indicates that a request for an object in the cache older than Jul. 1, 2014, 8:00 AM GMT (Zulu), where the object has a path name matched by the pattern "images/1/*.jpg," is a request for an invalid object. Likewise, the second rule 540, {"path": "images/1/*.bmp", "before": "2014-07-01T08:00Z" }, indicates that a request for an object in the cache older than Jul. 1, 2014, 8:00 AM GMT, where the object has a path name matched by the pattern "images/1/*.bmp," is a request for an invalid object. And the third rule 560, {"path": "images/2/*.jpg", "before": "2014-07-01T08:00Z" }, indicates that a request for an object in the cache older than Jul. 1, 2014, 8:00 AM GMT, where the object has a path name matched by the pattern "images/2/*.jpg," is a request for an invalid object.

In FIG. 5, the illustrated example cache invalidation rules have the same event horizon. FIG. 5 shows three examples for possible revised rules for use if two or more of the rules need to be replaced.

In some implementations, two or more rules are merged by generating a broader pattern that will match all objects matched by patterns associated with the rules merged. Strategies for merging these patterns include using file extensions in the alternative, using shared path structures, or using broader paths with additional wildcards. The following examples use a simplified grammar for these patterns; however, any pattern grammar may be used, including, for example, POSIX-style regular expressions. As a first example, the rules 520 and 540 can be merged to form a revised cache invalidation rule 524, {"path": "images/1/*.(jpg|bmp)", "before": "2014-07-01T08:00Z" }, which indicates that a request for an object in the cache older than Jul. 1, 2014, 8:00 AM GMT, where the object has a path name matched by the pattern "images/1/*.(jpg|bmp)", is a request for an invalid object. The pattern "images/1/*.(jpg|bmp)", will match anything satisfied by the pattern "images/1/*.jpg", and anything satisfied by the pattern "images/1/*.bmp". As a second example, the rules 520 and 560 can be merged to form a revised cache invalidation rule 526, {"path": "images/[12]/*.jpg", "before": "2014-07-01T08:00Z" }, which indicates that a request for an object in the cache older than Jul. 1, 2014, 8:00 AM GMT, where the object has a path name matched by the pattern "images/[12]/*.jpg", is a request for an invalid object. The pattern "images/[12]/*.jpg" will match anything satisfied by the pattern "images/1/*.jpg", and anything satisfied by the pattern "images/2/*.jpg".

In some implementations, a revised rule is generated using a predefined classification of cache entries encompassing a set of cache entries invalidated by the one or more subsumable rules to be replaced by the revised rule. For example, two or more rules can be merged by identifying a common filetype classification for cache entries to be invalidated. For example, the rules 520, 540, and 560 can be merged to form a revised cache invalidation rule 570, {"path": "images/*/*", "class": "image file", "before": "2014-07-01T08:00Z" }, which indicates that a request for an object in the cache older than Jul. 1, 2014, 8:00 AM GMT, where the object has a path name matched by the pattern "images/*/*," and is any known image file type, is a request for an invalid object. The cache entries invalidated by this combined rule are a superset of the previously invalidated cache entries. In some implementations, classifications are configurable by an administrator. For example, the class "image file," may be defined as files with extensions of JPEG, JPG, BMP, TIFF, PNG, GIF, MPO, CD5, STL, and PSD. An administrator can then use the cache control interface to add files with other extensions, e.g., "RAW".

In some implementations, each cache invalidation rule specifies one or more attributes to be compared to one or more specific patterns included in the respective invalidation rules. Attributes may include, for example, the request string, an identifier for the cache entry, a cache key associated with the cache entry, metadata associated with the cache entry, content data of the cache entry, a cache entry type, a cache entry classification, a cache segment qualifier, a usage statistic, a group membership, a cache insertion time, an object creation time, an event occurrence time, a logical sequence number, or a Lamport sequence number. A time can be expressed as a specific time or as an offset relative to the current time. In some implementations, an invalidation rule can be broadened by omitting a particular attribute comparison specified in a rule. For example, an invalidation rule satisfied by all HTML files older than a particular date and having content data containing a particular phrase can be subsumed into an invalidation rule satisfied by all HTML files older than the particular date without regard to the content data. In some implementations, multiple invalidation rules are coalesced by generating a replacement rule containing the least restrictive event horizon and attribute comparisons that are common to each the multiple invalidation rules to be replaced. For example, a first invalidation rule for all HTML files older than Nov. 1, 2016, and containing the phrase "candidate Smith" may be coalesced with a second invalidation rule for all HTML files older than Nov. 4, 2016, containing the phrase "candidate Wilson". The resulting replacement invalidation rule, in this example, would be satisfied by all HTML files older than Nov. 4, 2016. This example rule retains the HTML attribute comparison and uses the least restrictive (most inclusive) event horizon of Nov. 4, 2016, but omits the content comparison because the comparison is not common to both of the rules subsumed.

In some implementations, a cache system accepts various rules from an administrative interface, e.g., the cache control interface 172 shown in FIG. 1, and, transparently to the administrator, automatically coalesces older rules to compress the maintained rule set. That is, the administrator simply enters generic descriptions of the items to be invalidated, and the cache system converts the descriptions into a rule set within the limitations and constraints for the system. In some implementations, rules are generated automatically, e.g., in response to external events.

Figure 6:
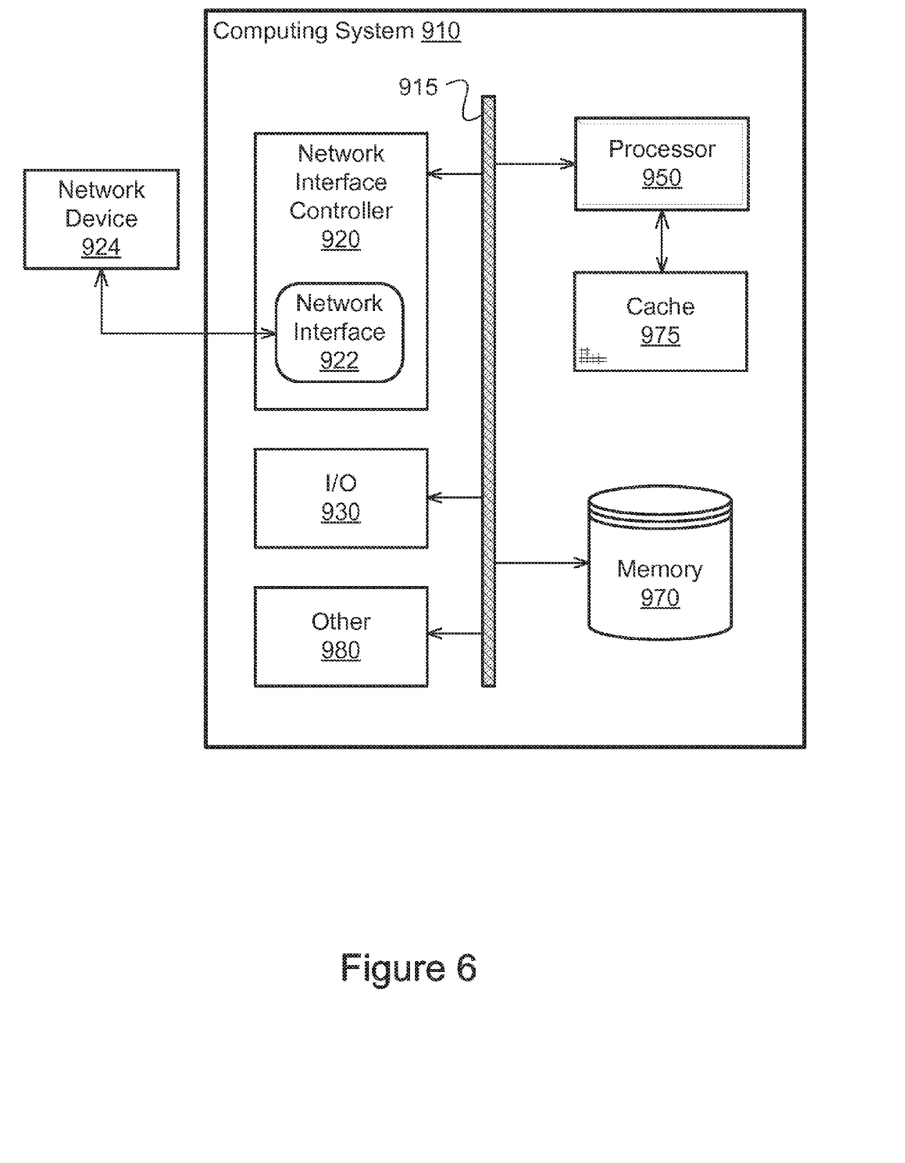
FIG. 6 is a block diagram of a computing system in accordance with an illustrative implementation.

FIG. 6 is a block diagram of a computing system 910 suitable for use in implementing the computerized components described herein. In broad overview, the computing system 910 includes at least one processor 950 for performing actions in accordance with instructions, and one or more memory devices 970 and/or 975 for storing instructions and data. The illustrated example computing system 910 includes one or more processors 950 in communication, via a bus 915, with memory 970 and with at least one network interface controller 920 with a network interface 922 for connecting to external network devices 924, e.g., participating in a network (such as the network 110 shown in FIG. 1). The one or more processors 950 are also in communication, via the bus 915, with any I/O devices at one or more I/O interfaces 930, and any other devices 980. The processor 950 illustrated incorporates, or is directly connected to, cache memory 975. Generally, a processor will execute instructions received from memory.

In more detail, the processor 950 may be any logic circuitry that processes instructions, e.g., instructions fetched from the memory 970 or cache 975. In many embodiments, the processor 950 is a microprocessor unit or special purpose processor. The computing device 910 may be based on any processor, or set of processors, capable of operating as described herein. The processor 950 may be a single core or multi-core processor. The processor 950 may be multiple processors.

The memory 970 may be any device suitable for storing computer readable data. The memory 970 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, and BluRay® discs). A computing system 910 may have any number of memory devices 970.

The cache memory 975 is generally a form of computer memory placed in close proximity to the processor 950 for fast read times. In some implementations, the cache memory 975 is part of, or on the same chip as, the processor 950. In some implementations, there are multiple levels of cache 975, e.g., L2 and L3 cache layers.

The network interface controller 920 manages data exchanges via the network interface 922. The network interface controller 920 handles the physical and data link layers of the OSI model for network communication. In some implementations, some of the network interface controller's tasks are handled by the processor 950. In some implementations, the network interface controller 920 is part of the processor 950. In some implementations, a computing system 910 has multiple network interface controllers 920. In some implementations, the network interface 922 is a connection point for a physical network link, e.g., an RJ 45 connector. In some implementations, the network interface controller 920 supports wireless network connections and an interface port 922 is a wireless receiver/transmitter. Generally, a computing device 910 exchanges data with other computing devices 924 via physical or wireless links to a network interface 922. In some implementations, the network interface controller 920 implements a network protocol such as Ethernet.

The other computing devices 924 are connected to the computing device 910 via a network interface port 922. The other computing device 924 may be a peer computing device, a network device, or any other computing device with network functionality. For example, a computing device 924 may be a network device such as a hub, a bridge, a switch, or a router, connecting the computing device 910 to a data network such as the Internet.

In some uses, the I/O interface 930 supports an input device and/or an output device (not shown). In some uses, the input device and the output device are integrated into the same hardware, e.g., as in a touch screen. In some uses, such as in a server context, there is no I/O interface 930 or the I/O interface 930 is not used. In some uses, additional other components 980 are in communication with the computer system 910, e.g., external devices connected via a universal serial bus (USB).

The other devices 980 may include an I/O interface 930, external serial device ports, and any additional co-processors. For example, a computing system 910 may include an interface (e.g., a universal serial bus (USB) interface) for connecting input devices (e.g., a keyboard, microphone, mouse, or other pointing device), output devices (e.g., video display, speaker, refreshable Braille terminal, or printer), or additional memory devices (e.g., portable flash drive or external media drive). In some implementations an I/O device is incorporated into the computing system 910, e.g., a touch screen on a tablet device. In some implementations, a computing device 910 includes an additional device 980 such as a co-processor, e.g., a math co-processor that can assist the processor 950 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A system comprising:
   a computer readable memory storing a set of rules;
   a cache configured to receive a cache request, identify a requested cache entry corresponding to the cache request, and determine that the requested cache entry is stale in response to at least one of the rules existing in the stored set of rules being satisfied by the requested cache entry; and
   one or more processors configured to:
      accept a rule insertion request, the rule insertion request specifying a new rule not present in the existing set of rules;
      generate, responsive to a determination that adding the new rule to the existing set of rules will exceed a rule-set capacity limitation, a revised rule that subsumes the union of one or more subsumable rules, where each of the one or more subsumable rules is either the new rule or a rule in the existing set of rules, and the revised rule is broader than each of the subsumed rules; and
      update the set of rules to be a modified set of rules that does not exceed the capacity limitation, wherein the modified set of rules includes the revised rule and excludes the one or more subsumable rules subsumed by the revised rule.

2. The system of claim 1, wherein the modified set of rules includes the new rule only when the one or more subsumable rules subsumed by the revised rule does not include the new rule.

3. The system of claim 1, wherein, responsive to the determination that the new rule combined with the set of rules will exceed the capacity limitation, the one or more processors are configured to identify the one or more subsumable rules, and generate the revised rule by at least one of:
   generating a composite regular expression satisfied by anything satisfying corresponding regular expressions in each of the one or more subsumable rules;
   selecting an event horizon after, or coincident with, corresponding event horizons in each of the one or more subsumable rules; and using a predefined classification of cache entries encompassing a set of cache entries invalidated by the one or more subsumable rules.

4. The system of claim 1, wherein at least one rule in the set of rules includes a regular expression, and the at least one rule is satisfied by the cache entry when one or more of the following apply:
the cache request for the cache entry includes a request string that satisfies the respective regular expression included in the at least one rule;
the requested cache entry is associated with an identifier that satisfies the respective regular expression included in the at least one rule;
the requested cache entry includes metadata that satisfies the respective regular expression included in the at least one rule; or
the requested cache entry includes content data that satisfies the respective regular expression included in the at least one rule.

5. The system of claim 1, wherein at least one rule in the set of rules includes a regular expression, and the at least one rule is satisfied by the cache entry when an attribute of the cache entry satisfies the regular expression, wherein the attribute is indicated in the at least one rule and the attribute is one of: an identifier for the cache entry, a request string for the cache entry, a cache key associated with the cache entry, metadata associated with the cache entry, or content data of the cache entry.

6. The system of claim 1, wherein at least one rule in the set of rules specifies an event horizon, and the at least one rule is satisfied by a cache entry with a corresponding event identifier that is prior to the respective event horizon specified in the at least one rule.

7. The system of claim 6, wherein the event horizon is one of a cache insertion time, an object creation time, an event occurrence time, a logical sequence number, or a Lamport sequence number.

8. The system of claim 1, wherein the capacity limitation is one of a maximum number of rules and a maximum computer memory requirement for storing the set of rules.

9. The system of claim 1, wherein the one or more processors are configured to update the requested cache entry, responsive to the determination that the requested cache entry is stale, wherein the update revalidates the requested cache entry and modifies at least one attribute of the revalidated requested cache entry.

10. The system of claim 9, wherein the at least one attribute is one of a cache insertion time, an object creation time, an event occurrence time, a logical sequence number, or a Lamport sequence number.

11. The system of claim 1, wherein the one or more processors are configured to receive a later cache request for a second cache entry that satisfies the revised rule and determine that the second cache entry is stale, wherein the second cache entry would not have satisfied any of the subsumed rules.

12. A method comprising:
storing, by a cache validation system, a set of rules in a computer readable memory;
receiving, by the cache validation system, a cache request, identifying a requested cache entry corresponding to the cache request, and determining that the requested cache entry is stale in response to at least one of the rules existing in the stored set of rules being satisfied by the requested cache entry;
accepting, by the cache validation system, a rule insertion request specifying a new rule not present in the an existing set of rules stored as the set of rules in the computer readable memory;
generating, by the cache validation system, responsive to a determination that adding the new rule to the existing set of rules would exceed a rule-set capacity limitation, a revised rule that subsumes that the union of one or more subsumable rules, where each of the one or more subsumable rules is either the new rule or a rule in the existing set of rules and the revised rule is broader than each of the subsumed rules; and
updating, by the cache validation system, the set of rules to be a modified set of rules that does not exceed the capacity limitation, wherein the modified set of rules includes the revised rule and excludes the one or more subsumable rules subsumed by the revised rule.

13. The method of claim 12, comprising including, in the modified set of rules, the new rule only when the one or more subsumable rules subsumed by the revised rule does not include the new rule.

14. The method of claim 12, comprising identifying the one or more subsumable rules, responsive to the determination that the new rule combined with the set of rules will exceed the capacity limitation, and generating the revised rule by at least one of:
generating a composite regular expression satisfied by anything satisfying corresponding regular expressions in each of the one or more subsumable rules;
selecting an event horizon after, or coincident with, corresponding event horizons in each of the one or more subsumable rules; and
using a predefined classification of cache entries encompassing a set of cache entries invalidated by the one or more subsumable rules.

15. The method of claim 12, wherein at least one rule in the set of rules includes a regular expression, and the at least one rule is satisfied by the cache entry when one or more of the following apply:
the cache request for the cache entry includes a request string that satisfies the respective regular expression included in the at least one rule;
the requested cache entry is associated with an identifier that satisfies the respective regular expression included in the at least one rule;
the requested cache entry includes metadata that satisfies the respective regular expression included in the at least one rule; or
the requested cache entry includes content data that satisfies the respective regular expression included in the at least one rule.

16. The method of claim 12, wherein at least one rule in the set of rules specifies an event horizon, and the at least one rule is satisfied by a cache entry with a corresponding event identifier that is prior to the respective event horizon specified in the at least one rule, wherein the event horizon is one of a cache insertion time, an object creation time, an event occurrence time, a logical sequence number, or a Lamport sequence number.

17. The method of claim 12, wherein the capacity limitation is one of a maximum number of rules or a maximum computer memory requirement for storing the set of rules.

18. A non-transitory computer-readable medium storing instructions that, when executed by one or more computing processors, cause the one or more computing processors to:
store a set of rules in a rewritable computer-readable memory;
receive a cache request, identify a requested cache entry corresponding to the cache request, and determine that the requested cache entry is stale in response to at least one of the rules existing in the stored set of rules being satisfied by the requested cache entry;

accept a rule insertion request specifying a new rule not present in the existing stored set of rules;

generate, responsive to a determination that adding the new rule to the existing set of rules would exceed a rule-set capacity limitation, a revised rule that subsumes the union of one or more subsumable rules, where each of the one or more subsumable rules is either the new rule or a rule in the existing set of rules, and the revised rule is broader than each of the subsumed rules; and update the stored set of rules to be a modified set of rules that does not exceed the capacity limitation, wherein the modified set of rules includes the revised rule and excludes the one or more subsumable rules subsumed by the revised rule.

19. The computer-readable medium of claim 18, the instructions further comprising instructions that, when executed by the one or more computing processors, cause the one or more computing processors to include, in the modified set of rules, the new rule only when the one or more subsumable rules subsumed by the revised rule does not include the new rule.

20. The computer-readable medium of claim 18, the instructions further comprising instructions that, when executed by the one or more computing processors, cause the one or more computing processors to identify the one or more subsumable rules, responsive to the determination that the new rule combined with the set of rules will exceed the capacity limitation, and generate the revised rule by at least one of:

generating a composite regular expression satisfied by anything satisfying corresponding regular expressions in each of the one or more subsumable rules;

selecting an event horizon after, or coincident with, corresponding event horizons in each of the one or more subsumable rules, wherein the selected event horizon is one of a cache insertion time, an object creation time, an event occurrence time, a logical sequence number, or a Lamport sequence number; and using a predefined classification of cache entries encompassing a set of cache entries invalidated by the one or more subsumable rules.

* * * * *